United States Patent
Muramatsu et al.

(10) Patent No.: US 12,071,134 B2
(45) Date of Patent: Aug. 27, 2024

(54) VEHICLE CONTROL DEVICE

(71) Applicant: ADVICS CO., LTD., Kariya (JP)

(72) Inventors: Sotaro Muramatsu, Kariya (JP); Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 310 days.

(21) Appl. No.: 17/442,007

(22) PCT Filed: Mar. 3, 2020

(86) PCT No.: PCT/JP2020/008885
§ 371 (c)(1),
(2) Date: Sep. 22, 2021

(87) PCT Pub. No.: WO2020/202983
PCT Pub. Date: Oct. 8, 2020

(65) Prior Publication Data
US 2022/0176963 A1    Jun. 9, 2022

(30) Foreign Application Priority Data
Mar. 29, 2019 (JP) .................. 2019-065366

(51) Int. Cl.
*B60W 30/18* (2012.01)
*B60W 10/06* (2006.01)
*B60W 10/184* (2012.01)

(52) U.S. Cl.
CPC ...... *B60W 30/18118* (2013.01); *B60W 10/06* (2013.01); *B60W 10/184* (2013.01); *B60W 2520/10* (2013.01); *B60W 2552/15* (2020.02)

(58) Field of Classification Search
CPC ........... B60W 30/18118; B60W 10/06; B60W 10/184; B60W 2520/10
See application file for complete search history.

(56) References Cited

U.S. PATENT DOCUMENTS 6,189,986 B1 * 2/2001 Shimizu ............... B60T 8/3275
303/155
9,751,463 B1 * 9/2017 Ramcharitar .......... G08G 1/052
(Continued)

FOREIGN PATENT DOCUMENTS

CN   101300538 A   * 11/2008 ............ B60K 26/02
CN   106285975 A   *  1/2017
(Continued)

OTHER PUBLICATIONS

International Search Report (PCT/ISA/210) with translation and Written Opinion (PCT/ISA/237) mailed on Jun. 9, 2020, by the Japan Patent Office as the International Searching Authority for International Application No. PCT/JP2020/008885. (11 pages).

(Continued)

*Primary Examiner* — Redhwan K Mawari
(74) *Attorney, Agent, or Firm* — BUCHANAN INGERSOLL & ROONEY PC (57) ABSTRACT

A stop control device which is a control device includes a gradient acquisition unit that acquires a road surface gradient; a drive instruction unit that executes a stopping drive instruction process for instructing a drive device to set a driving force of the vehicle to a magnitude corresponding to the road surface gradient when stopping the vehicle on a climbing road; and a braking instruction unit that executes a stopping braking instruction process of stopping the vehicle by instructing a braking device to apply a braking force corresponding to a required acceleration to the vehicle when stopping the vehicle on the climbing road.

9 Claims, 7 Drawing Sheets

(56) References Cited

U.S. PATENT DOCUMENTS

| | | | |
|---|---|---|---|
| 2010/0138123 A1 | 6/2010 | Tokimasa et al. | |
| 2011/0160974 A1 | 6/2011 | Fukuda et al. | |
| 2012/0173113 A1 | 7/2012 | Pilutti et al. | |
| 2013/0060433 A1 | 3/2013 | Maruyama et al. | |
| 2016/0368497 A1* | 12/2016 | Irie | B60W 30/18018 |
| 2017/0001636 A1 | 1/2017 | Laur et al. | |
| 2017/0369055 A1* | 12/2017 | Saigusa | G08G 1/096775 |
| 2019/0064793 A1* | 2/2019 | Sun | B60R 16/0236 |
| 2022/0169251 A1 | 6/2022 | Muramatsu et al. | |
| 2022/0176963 A1 | 6/2022 | Muramatsu et al. | |

FOREIGN PATENT DOCUMENTS

| | | | |
|---|---|---|---|
| DE | 198 38 972 A1 | | 3/2000 |
| DE | 69723971 T2 | * | 6/2004 |
| DE | 10 2009 056 130 A1 | | 7/2010 |
| DE | 10 2010 064 138 A1 | | 9/2011 |
| DE | 11 2011 101 690 B4 | | 12/2021 |
| JP | 2006069245 A | * | 3/2006 |
| JP | 2008049836 A | | 3/2008 |
| JP | 2012046182 A | | 3/2012 |
| JP | 2012066772 A | | 4/2012 |
| JP | 2017182585 A | * | 10/2017 |
| JP | 2018090064 A | | 6/2018 |
| JP | 7331415 B2 | | 8/2023 |

OTHER PUBLICATIONS

U.S. Appl. No. 17/441,995, filed Sep. 22, 2021, Sotaro Muramatsu.

* cited by examiner

VEHICLE CONTROL DEVICE

TECHNICAL FIELD

The present disclosure relates to a vehicle control device.

BACKGROUND ART

Patent Literature 1 describes an example of a vehicle control device for stopping a vehicle on a climbing road. In this control device, the vehicle may stop on the climbing road by increasing the braking force of the vehicle by controlling the braking device while decreasing the driving force of the vehicle by controlling the drive device.

CITATIONS LIST

Patent Literature

Patent Literature 1: Japanese Unexamined Patent Application Publication No. 2018-90064

SUMMARY

Technical Problems

When automatically stopping the vehicle, the required acceleration with respect to the vehicle is set, and the drive of the drive device and the braking device is controlled based on the required acceleration. When stopping the vehicle on a climbing road, a deceleration component corresponding to the gradient of the climbing road acts on the vehicle. Therefore, in a case where the vehicle is to be stopped on a climbing road while adjusting both the driving force and the braking force of the vehicle, the vehicle body acceleration is controlled by adjusting both the driving force and the braking force while taking the magnitude of the gradient of the road surface into consideration, and deterioration in the controllability of the deceleration control when decelerating the vehicle according to the required acceleration to stop the vehicle becomes a concern.

Solutions to Problems

A vehicle control device for solving the above problem is a vehicle control device that controls a drive device and a braking device of a vehicle. One aspect of the control device includes a gradient acquisition unit that acquires a road surface gradient which is a gradient of a road surface on which the vehicle travels; a drive instruction unit that executes a stopping drive instruction process for instructing the drive device to set a driving force of the vehicle to a magnitude corresponding to the road surface gradient when stopping the vehicle on a climbing road; and a braking instruction unit that executes a stopping braking instruction process of stopping the vehicle by instructing the braking device to apply a braking force corresponding to a required acceleration to the vehicle when stopping the vehicle on the climbing road.

According to the above configuration, when the stopping drive instruction process is executed when stopping the vehicle on the climbing road, where when the drive device is controlled based on the instruction from the drive instruction unit, the driving force of the vehicle becomes a magnitude corresponding to the road surface gradient. Thus, the deceleration component of the vehicle corresponding to the road surface gradient can be offset by the acceleration component of the vehicle caused by the driving force of the vehicle. According to the above configuration, when stopping the vehicle on the climbing road, the stopping braking instruction process is also executed in addition to the stopping drive instruction process. When the stopping braking instruction process is executed, the braking device is controlled based on the instruction from the braking instruction unit. In this case, the braking force corresponding to the required acceleration is applied to the vehicle. As described above, in a case where the drive device is driven based on the execution of the stopping drive instruction process, since the deceleration component of the vehicle corresponding to the road surface gradient is offset by the acceleration component of the vehicle caused by the driving force of the vehicle, the deviation between the vehicle body acceleration of the vehicle and the required acceleration is less likely to occur as the braking force corresponding to the required acceleration is applied to the vehicle. That is, the vehicle body acceleration of the vehicle is adjusted by controlling the braking force of the vehicle while reducing the influence of the magnitude of the road surface gradient by controlling the driving force of the vehicle. Therefore, the controllability of the deceleration control of the vehicle when stopping the vehicle on the climbing road can be improved.

Furthermore, one aspect of a vehicle control device includes a gradient acquisition unit that acquires a road surface gradient which is a gradient of a road surface on which the vehicle travels; and a braking instruction unit that executes a stopping instruction process for instructing the braking device to set a braking force of the vehicle to a magnitude corresponding to the road surface gradient regardless of a required acceleration to stop the vehicle when stopping the vehicle on a climbing road from a traveling state.

DESCRIPTION OF EMBODIMENTS

First Embodiment

Hereinafter, one embodiment of a vehicle control device will be described with reference to FIGS. 1 to 4A-4D.

Figure 1:
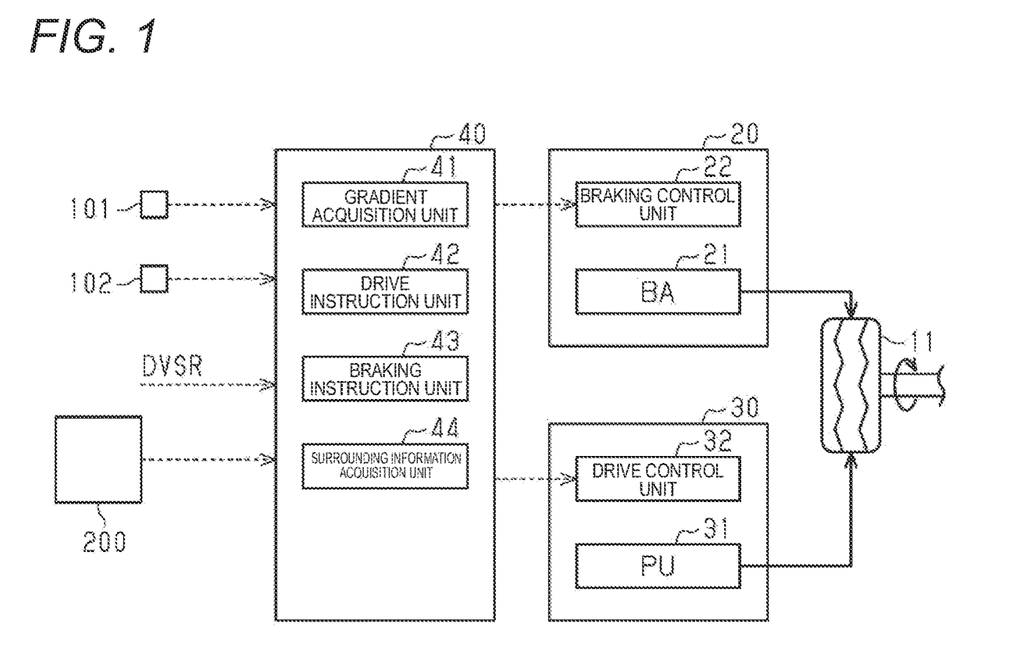
FIG. 1 is a block diagram illustrating a schematic configuration of a stop control device, a braking device, and a drive device which are first embodiments of a vehicle control device.

FIG. 1 illustrates a stop control device 40, a braking device 20, and a drive device 30 which are examples of the control device of the present embodiment. The braking device 20 includes a braking actuator 21 and a braking control unit 22 that controls the braking actuator 21. The braking control unit 22 adjusts a braking force BP of the vehicle by controlling the braking actuator 21. The drive device 30 includes a power unit 31 and a drive control unit 32 that controls the power unit 31. The power unit 31 includes an engine as a power source of the vehicle. Then, the drive control unit 32 adjusts a driving force DP of the vehicle by controlling the power unit 31.

Various sensors are provided in the vehicle. Examples of the sensor include a wheel speed sensor 101 and a longitudinal acceleration sensor 102. The wheel speed sensor 101 detects the wheel speed VW of the wheel 11 of the vehicle, and outputs a signal corresponding to the detected wheel speed VW as a detection signal. The longitudinal acceleration sensor 102 detects a longitudinal acceleration GX which is the acceleration in the longitudinal or front-rear direction of the vehicle, and outputs a signal corresponding to the detected longitudinal acceleration GX as a detection signal.

In addition, the vehicle includes a surroundings monitoring device 200 that monitors an environment around the vehicle. The surroundings monitoring device 200 includes, for example, an imaging device such as a camera and a radar. The surroundings monitoring device 200 acquires size and position information of an obstacle existing around the vehicle. The obstacle herein refers to an obstacle having a size that requires avoidance of contact with the vehicle. Examples of such obstacle include, for example, other vehicles, pedestrians, guard rails, and walls.

The detection signal from the wheel speed sensor 101, the detection signal from the longitudinal acceleration sensor 102, and information transmitted from the surroundings monitoring device 200 are input to the stop control device 40. In the stop control device 40, the vehicle body speed VS of the vehicle is derived based on the wheel speed VW of the wheel 11 based on the detection signal from the wheel speed sensor 101. In addition, in the stop control device 40, a value obtained by time-differentiating the vehicle body speed VS is derived as the vehicle body acceleration DVS of the vehicle.

Furthermore, an instruction to stop the vehicle is input to the stop control device 40 from another control device while the vehicle is traveling, and a required acceleration DVSR, which is a required value of the vehicle body acceleration of the vehicle until the vehicle comes to a stop, is input from another control device. Then, the stop control device 40 includes a gradient acquisition unit 41, a drive instruction unit 42, a braking instruction unit 43, and a surrounding information acquisition unit 44, as functional units for decelerating the vehicle according to the required acceleration DVSR and stopping the vehicle when a vehicle stop instruction is input.

The gradient acquisition unit 41 acquires a road surface gradient θ that is the gradient of the road surface on which the vehicle is located. For example, the gradient acquisition unit 41 derives a value obtained by subtracting the vehicle body acceleration DVS from the longitudinal acceleration GX as the road surface gradient θ. When the vehicle is traveling on a horizontal road, the vehicle body acceleration DVS is substantially equal to the longitudinal acceleration GX. On the other hand, when the vehicle is traveling on a climbing road, the vehicle body acceleration DVS is smaller than the longitudinal acceleration GX, so that the road surface gradient θ is positive. Therefore, for example, in a case where a value greater than "0 (zero)" is set as the determination value, determination can be made that the vehicle is located on the climbing road when the road surface gradient θ is greater than or equal to the determination value.

The drive instruction unit 42 controls the drive device 30. That is, the drive instruction unit 42 outputs various instructions to the drive control unit 32 of the drive device 30. The contents of the instruction output from the drive instruction unit 42 to the drive control unit 32 will be described later.

The braking instruction unit 43 controls the braking device 20. That is, the braking instruction unit 43 outputs various instructions to the braking control unit 22 of the braking device 20. The contents of the instruction output from the braking instruction unit 43 to the braking control unit 22 will be described later.

The surrounding information acquisition unit 44 acquires information transmitted from the surrounding monitoring device 200 as surrounding information of the vehicle. The surrounding information acquisition unit 44 analyzes the acquired information and detects another vehicle approaching the host vehicle from behind. For example, when another vehicle is present behind the host vehicle, the surrounding information acquisition unit 44 derives an inter-vehicle distance between the host vehicle and another vehicle. Then, when the derived inter-vehicle distance is less than the approach determination distance, the surrounding information acquisition unit 44 detects another vehicle approaching the host vehicle from behind. On the other hand, when the derived inter-vehicle distance is greater than or equal to the approach determination distance, the surrounding information acquisition unit 44 does not detect another vehicle approaching the host vehicle from behind. In addition, when there is no other vehicle behind the host vehicle, the surrounding information acquisition unit 44 does not detect another vehicle approaching the host vehicle from behind.

Figure 2:
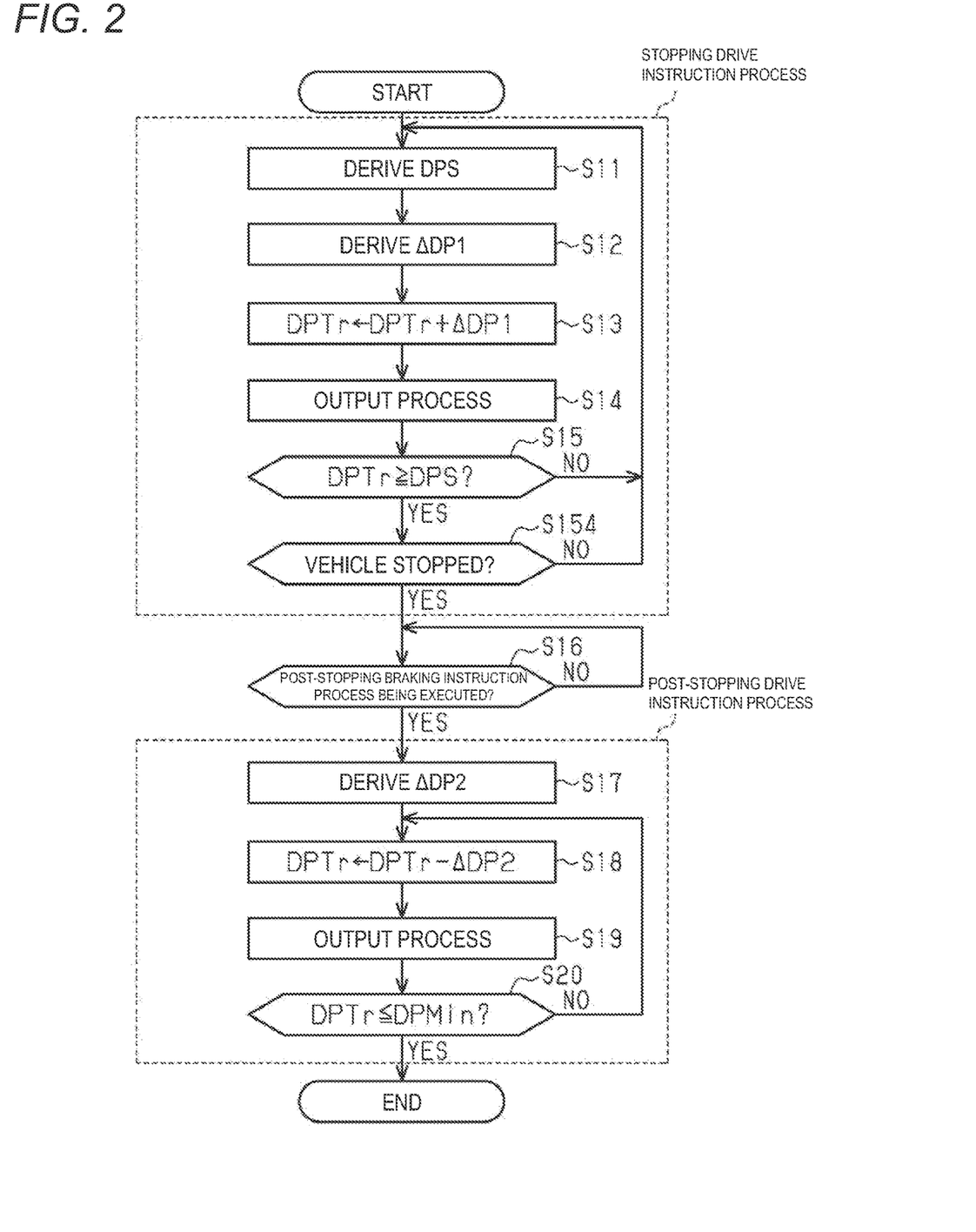
FIG. 2 is a flowchart describing a processing routine executed to control the drive device.

Next, a processing routine executed by the drive instruction unit 42 when stopping the vehicle will be described with reference to FIG. 2. This processing routine is executed when a vehicle stop instruction is input from another control device to the stop control device 40 while the vehicle is traveling on the climbing road.

In this processing routine, a stopping drive instruction process is executed. That is, in the stopping drive instruction process, in the first step S11, the target driving force DPS, which is the target value of the driving force of the vehicle, is derived. The target driving force DPS is derived so as to have a greater value as the road surface gradient θ acquired by the gradient acquisition unit 41 becomes larger. That is, the absolute value of the target driving force DPS can be said to be a magnitude corresponding to the road surface gradient θ.

Here, when the vehicle is traveling on a climbing road, a deceleration component corresponding to the road surface gradient θ acts on the vehicle. On the other hand, when the drive device 30 is driven, an acceleration component corresponding to the driving force DP acts on the vehicle. Therefore, in the present embodiment, the driving force DP capable of causing the acceleration component that matches the magnitude of the deceleration component corresponding to the road surface gradient θ to act on the vehicle is set as the target driving force DPS.

When the target driving force DPS is set, the process proceeds to the next step S12. In step S12, a drive increase amount ΔDP1 corresponding to an increasing speed of the driving force DP when increasing the driving force DP to the target driving force DPS is derived. In the present embodiment, when the instruction driving force DPTr is less than the target driving force DPS, determination can be made that the driving force DP has not reached the target driving force DPS, and thus a positive value is set as the drive increase amount ΔDP1. Specifically, the drive increase amount ΔDP1 is derived so as to have a greater value as the road surface gradient θ acquired by the gradient acquisition unit 41 becomes larger. On the other hand, when the instruction driving force DPTr is greater than or equal to the target driving force DPS, determination can be made that the driving force DP has reached the target driving force DPS, and thus "0 (zero)" is set as the drive increase amount ΔDP1.

In step S13, the sum of the instruction driving force DPTr of the current time point and the drive increase amount ΔDP1 is calculated as the latest instruction driving force DPTr. Subsequently, in step S14, an output process of outputting the latest instruction driving force DPTr to the drive control unit 32 is executed. Then, in step S15, whether or not the latest instruction driving force DPTr is greater than or equal to the target driving force DPS derived in step S11 is determined. When the instruction driving force DPTr is greater than or equal to the target driving force DPS, determination can be made that the driving force DP of the vehicle has increased to a magnitude corresponding to the road surface gradient θ.

When the instruction driving force DPTr is less than the target driving force DPS (S15: NO), the process proceeds to step S11 described above. On the other hand, when the instruction driving force DPTr is greater than or equal to the target driving force DPS (S15: YES), the process proceeds to the next step S154. In step S154, whether or not the vehicle is stopped is determined. For example, when the state in which the rotation of the wheel 11 is stopped continues for a predetermined time or longer, determination is made that the vehicle is stopped. When the duration of the state in which the rotation of the wheel 11 is stopped is less than the predetermined time and when the rotation of the wheel 11 is not stopped, determination is not made that the vehicle is stopped. Whether or not the rotation of the wheel 11 is stopped can be determined based on a detection signal from the wheel speed sensor 101.

When determination is not made that the vehicle is stopped in step S154 (NO), the process proceeds to step S11 described above. That is, the stopping drive instruction process is continued. On the other hand, when determination is made that the vehicle is stopped (S154: YES), the stopping drive instruction process is terminated. Thereafter, the process proceeds to the next step S16.

When the instruction driving force DPTr is input by execution of the output process, the drive control unit 32 controls the power unit 31 so that the driving force DP follows the instruction driving force DPTr. Therefore, when an instruction based on the execution of the stopping drive instruction process is input to the drive control unit 32, the driving force DP can be increased to a magnitude corresponding to the road surface gradient θ, that is, the target driving force DPS at a speed corresponding to the drive increase amount ΔDP1.

In step S16, whether or not a post-stopping braking instruction process described later is executed by the braking control unit 22 is determined. If the post-stopping braking instruction process has not yet been executed (S16: NO), the determination in step S16 is repeated until the post-stopping braking instruction process is started. On the other hand, when the post-stopping braking instruction process is executed (S16: YES), the post-stopping drive instruction process is executed.

In the post-stopping drive instruction process, in the first step S17, the drive decrease amount ΔDP2 corresponding to the decreasing speed of the driving force DP is derived. In the present embodiment, the drive decrease amount ΔDP2 is a positive value, but is smaller than the drive increase amount ΔDP1. Depending on the magnitude of the braking increase amount of an instruction driving force DPTr and an instruction braking force BPTr to be described later, the drive decrease amount ΔDP2 becomes greater than the drive increase amount ΔDP1 in some cases.

Subsequently, in step S18, a value obtained by subtracting the drive decrease amount ΔDP2 from the instruction driving force DPTr at the current time point is calculated as the latest instruction driving force DPTr. Subsequently, in step S19, an output process of outputting the latest instruction driving force DPTr to the drive control unit 32 is executed. Then, in step S20, whether or not the latest instruction driving force DPTr is less than or equal to the minimum driving force DPMin is determined. As the minimum driving force DPMin, a minimum value of the driving force that can be applied to the vehicle by the drive of the drive device 30 or a driving force slightly greater than the minimum value is set. When the instruction driving force DPTr is less than or equal to the minimum driving force DPMin, the driving force DP of the vehicle cannot be further decreased.

When the instruction driving force DPTr is input by execution of the output process, the drive control unit 32 controls the power unit 31 so that the driving force DP follows the instruction driving force DPTr. Therefore, when an instruction based on the execution of the post-stopping drive instruction process is input to the drive control unit 32, the driving force DP can be decreased to less than or equal to the minimum driving force DPMin at a speed corresponding to the drive decrease amount ΔDP2.

In step S20, when the instruction driving force DPTr is greater than the minimum driving force DPMin (NO), the process proceeds to step S18 described above. That is, the post-stopping drive instruction process is continued. On the other hand, when the instruction driving force DPTr is less than or equal to the minimum driving force DPMin (S20: YES), the post-stopping drive instruction process is terminated. Then, the present processing routine is terminated.

Figure 3:
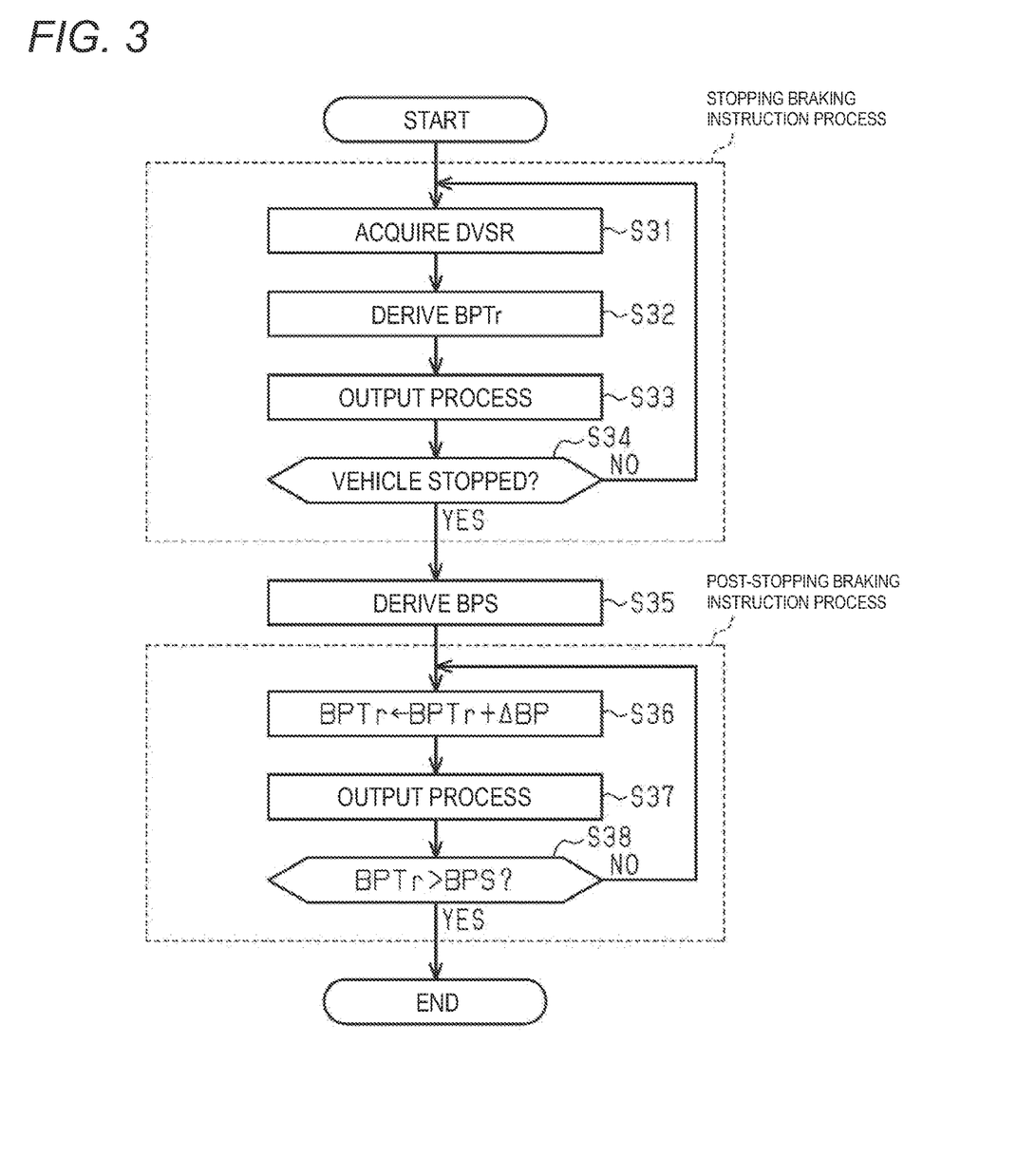
FIG. 3 is a flowchart describing a processing routine executed to control the braking device.

Next, a processing routine executed by the braking instruction unit 43 when stopping the vehicle will be described with reference to FIG. 3. This processing routine is executed when a vehicle stop instruction is input from another control device to the stop control device 40 while the vehicle is traveling on the climbing road.

In this processing routine, a stopping braking instruction process is executed. In the stopping braking instruction process, in the first step S31, the required acceleration DVSR is acquired. Subsequently, in step S32, a value corresponding to the required acceleration DVSR is derived as the instruction braking force BPTr. Specifically, a value corresponding to the required acceleration DVSR is derived as a feedforward term by feedforward control. Furthermore, a value corresponding to a deviation between the required acceleration DVSR and the vehicle body acceleration DVS is derived as a feedback term by the feedback control. Then, the sum of the feedforward term and the feedback term is derived as the instruction braking force BPTr. Then, in step S33, an output process of outputting the instruction braking force BPTr to the braking control unit 22 is executed. In the next step S34, whether or not the vehicle is stopped is determined, as in the above step S154.

When determination is not made that the vehicle is stopped in step S34 (NO), the process proceeds to step S31 described above. That is, the stopping braking instruction process is continued. On the other hand, when determination is made that the vehicle is stopped (S34: YES), the stopping braking instruction process is terminated. Thereafter, the process proceeds to the next step S35.

When the instruction braking force BPTr is input by the execution of the output process, the braking control unit 22 controls the braking actuator 21 so that the braking force BP follows the instruction braking force BPTr. Therefore, when an instruction based on the execution of the stopping braking instruction process is input to the braking control unit 22, the vehicle body acceleration DVS of the vehicle can be made to follow the required acceleration DVSR.

In step S35, the target braking force BPS is derived based on the road surface gradient θ acquired by the gradient acquisition unit 41. As the target braking force BPS, a minimum value of the braking force capable of maintaining the stopping of the vehicle even if the driving force DP is less than or equal to the minimum driving force DPMin, or a value slightly greater than the minimum value is set. Therefore, the target braking force BPS increases as the road surface gradient θ increases. Then, when the target braking force BPS is derived, the post-stopping braking instruction process is executed.

In the post-stopping braking instruction process, in the first step S36, the sum of the instruction braking force BPTr at the current time point and the braking increase amount ΔBP is derived as the latest instruction braking force BPTr. The braking increase amount ΔBP is greater than the drive decrease amount ΔDP2. Subsequently, in step S37, an output process of outputting the latest instruction braking force BPTr to the braking control unit 22 is executed. In the next step S38, whether or not the latest instruction braking force BPTr is greater than the target braking force BPS derived in step S35 is determined.

When the instruction braking force BPTr is input by the execution of the output process, the braking control unit 22 controls the braking actuator 21 so that the braking force BP follows the instruction braking force BPTr. Therefore, the braking force BP can be increased at a speed corresponding to the braking increase amount ΔBP by inputting an instruction based on the execution of the post-stopping braking instruction process to the braking control unit 22.

In step S38, when the instruction braking force BPTr is less than or equal to the target braking force BPS (NO), the process proceeds to step S36 described above. That is, the post-stopping braking instruction process is continued. On the other hand, when the instruction braking force BPTr is greater than the target braking force BPS (S38: YES), the post-stopping braking instruction process is terminated. Then, the present processing routine is terminated.

Figure 4A:
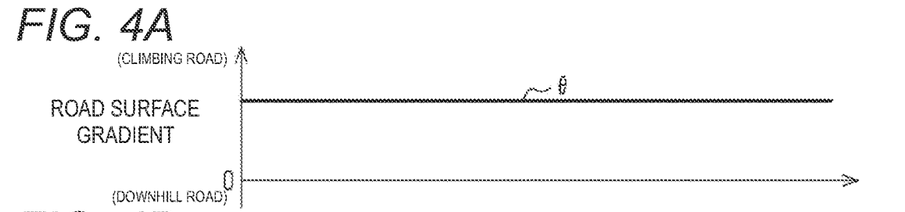
FIGS. 4A to 4D are timing charts when stopping the vehicle on a climbing road.
Figure 4B:
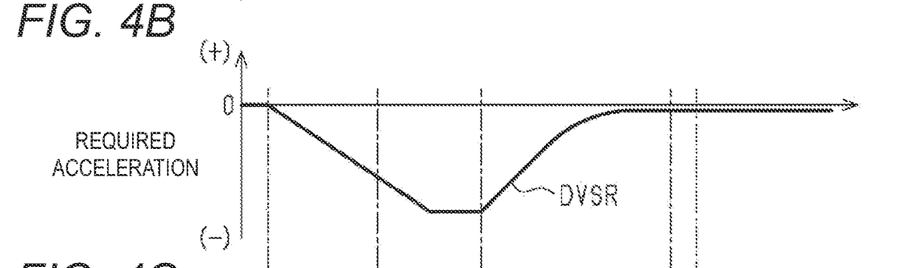
Figure 4C:
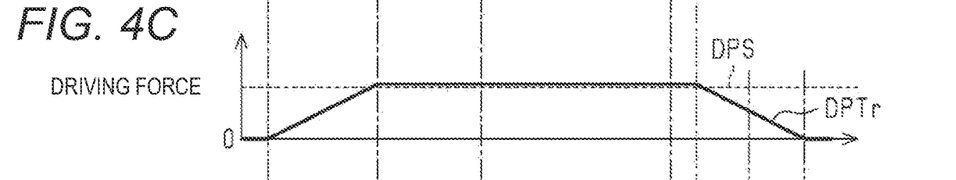
Figure 4D:
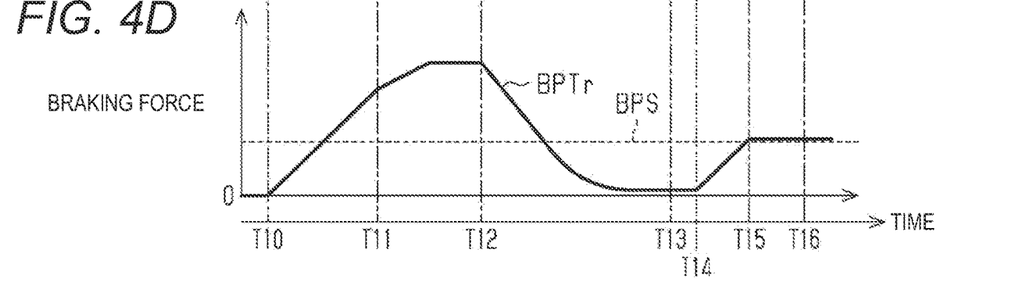

Next, the operation and effect of the present embodiment will be described with reference to FIGS. 4A-4D. As a premise, it is assumed that the vehicle is stopped on a climbing road as illustrated in FIG. 4A.

As illustrated in FIGS. 4A, 4B, 4C and 4D, when stopping of the vehicle is instructed at timing T10, the stopping drive instruction process is started. Then, the instruction driving force DPTr is increased at a speed corresponding to the drive increase amount ΔDP1 by the stopping drive instruction process. Then, the instruction driving force DPTr becomes greater than or equal to the target driving force DPS at timing T11. When the instruction driving force DPTr is increased in this manner, the driving force DP is increased until it becomes greater than or equal to the target driving force DPS within the period from timing T10 to timing T11. By increasing the driving force DP in this manner, the deceleration component of the vehicle corresponding to the road surface gradient θ can be offset by the acceleration component of the vehicle caused by the driving force DP.

In the example illustrated in FIGS. 4A-4D, the road surface gradient θ does not change from when the stop is instructed to when the vehicle actually stops. Thus, in the period after timing T11 in the execution period of the stopping drive instruction process, the instruction driving force DPTr is held at the magnitude of timing T11.

In the present embodiment, when the stopping of the vehicle is instructed, not only the stopping braking instruction process but also the stopping drive instruction process is started. Then, the instruction braking force BPTr is increased according to the increase in the absolute value of the required acceleration DVSR by the execution of the stopping braking instruction process. Since the deceleration component corresponding to the road surface gradient θ is offset by the acceleration component of the vehicle caused by the drive of the drive device 30 based on the execution of the stopping drive instruction process, the deviation between the vehicle body acceleration DVS of the vehicle and the required acceleration DVSR is less likely to occur by applying the braking force BP corresponding to the required acceleration DVSR to the vehicle. That is, the vehicle body acceleration DVS of the vehicle is adjusted by the control of the braking force BP of the vehicle while reducing the influence of the magnitude of the road surface gradient θ by the control of the driving force DP of the vehicle. Therefore, as compared with a case where both the driving force DP and the braking force BP are controlled in order to adjust the vehicle body acceleration DVS, the vehicle body acceleration DVS is adjusted by controlling the braking force BP having higher controllability than the driving force DP, whereby controllability in the deceleration control of the vehicle when stopping the vehicle on a climbing road can be improved.

After timing T12, the absolute value of the required acceleration DVSR is reduced before the vehicle stops. Then, the instruction braking force BPTr is decreased according to the decrease in the absolute value of the required acceleration DVSR. Therefore, at timing T13 when the vehicle stops, the acceleration component of the vehicle caused by the driving force DP and the deceleration component of the vehicle caused by the road surface gradient θ are balanced, so that the braking force BP is close to "0 (zero)". The swing-back of the vehicle body at the time of stopping the vehicle can be suppressed by decreasing the braking force BP at the time of stopping the vehicle as much as possible in this manner.

Since determination is made that the vehicle is stopped at timing T14, both the stopping drive instruction process and the stopping braking instruction process are terminated, and the post-stopping braking instruction process is started. Then, the instruction braking force BPTr is increased until it becomes greater than the target braking force BPS. Then, the instruction braking force BPTr becomes greater than or equal to the target braking force BPS at timing T15, and hence the post-stopping braking instruction process is terminated. When the instruction braking force BPTr is increased in this manner, the braking force BP is increased until it becomes greater than the target braking force BPS within the period from timing T14 to timing T15. Thus, after timing T15, the state in which the vehicle is stopped can be maintained even if the driving force DP becomes "0 (zero)".

Furthermore, when the post-stopping braking instruction process is started, the post-stopping drive instruction process is also started. Then, the instruction driving force DPTr is decreased until it becomes less than or equal to the minimum driving force DPMin. The decreasing speed of the instruction driving force DPTr at this time is lower than the increasing speed of the instruction braking force BPTr in the period from timing T14 to timing T15. Therefore, even if the driving force DP decreases due to the decrease in the instruction driving force DPTr, the vehicle can be suppressed from sliding down. That is, the driving force DP can be switched to the braking force BP while maintaining the stopping of the vehicle.

In the example illustrated in FIGS. 4A-4D, "0 (zero)" is set as the minimum driving force DPMin. Then, the driving force DP becomes less than or equal to the minimum driving force DPMin at timing T16, and hence the post-stopping drive instruction process is terminated.

Second Embodiment

Hereinafter, a second embodiment of a vehicle control device will be described with reference to FIGS. 5 and 6A-6E. The second embodiment is different from the first embodiment in that an instruction driving force DPTr is held at "0 (zero)" when stopping a vehicle on a climbing road. Therefore, in the following description, portions different from those of the first embodiment will be mainly described, and the same reference numerals will be denoted to the same or corresponding member configurations as those of the first embodiment, and redundant description will be omitted.

Figure 5:
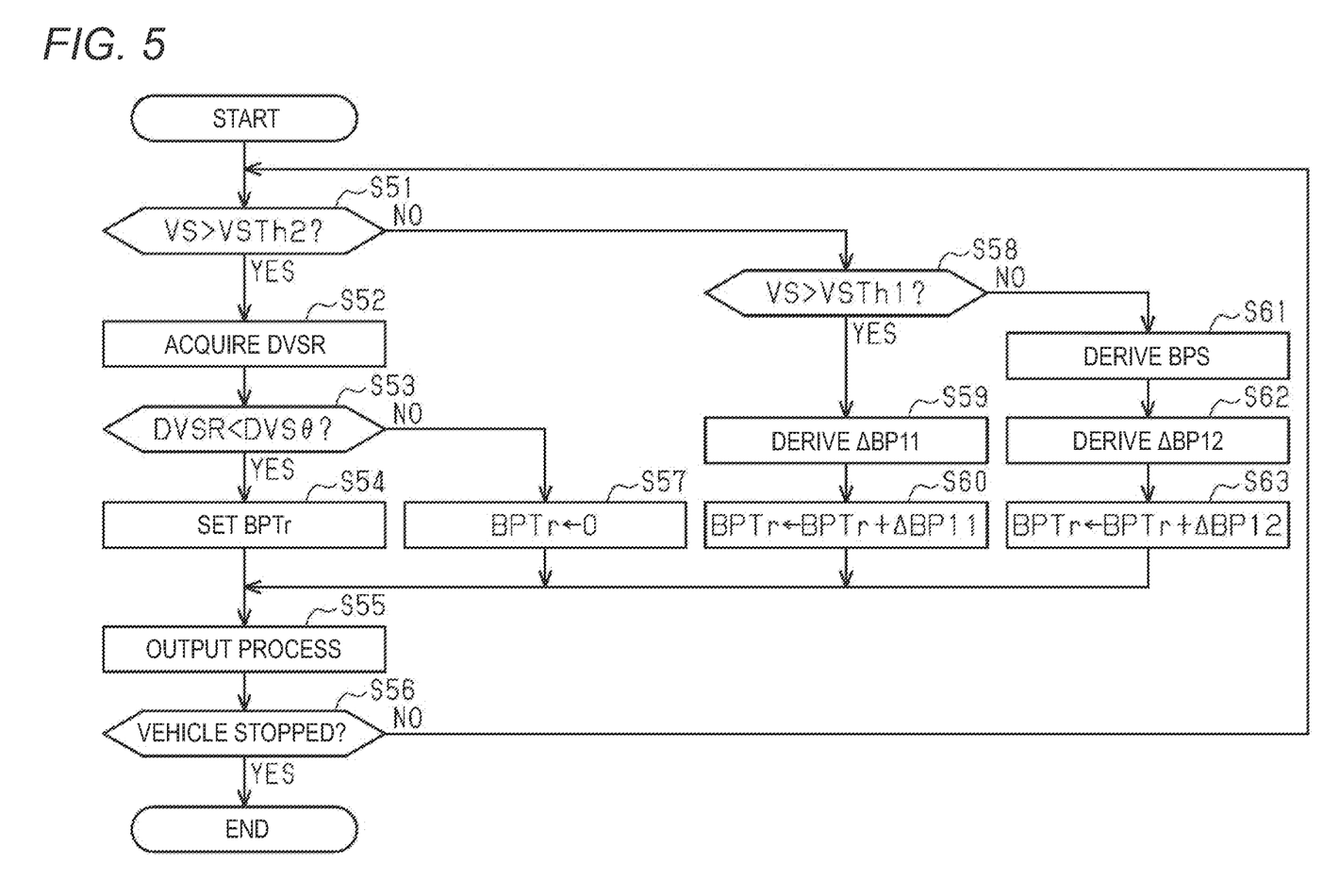
FIG. 5 is a flowchart describing a processing routine executed to control the braking device in a second embodiment.

Next, a processing routine executed by the braking instruction unit 43 when stopping the vehicle will be described with reference to FIG. 5. This processing routine is executed when a vehicle stop instruction is input from another control device to the stop control device 40 while the vehicle is traveling on the climbing road.

In this processing routine, the stopping instruction process is executed. The stopping instruction process executed in the present embodiment is different from the stopping braking instruction process executed in the first embodiment. Therefore, when the stopping braking instruction process executed in the first embodiment is referred to as a first stopping braking instruction process, the stopping instruction process executed in the present embodiment is also referred to as a second stopping braking instruction process.

In the second stopping braking instruction process serving as the stopping instruction process, in step S51, whether or not the vehicle body speed VS of the vehicle is higher than a second threshold value VSTh2 is determined. The second threshold value VSTh2 is set as a criterion for determining whether it is essential to apply braking force to the vehicle. That is, when the vehicle body speed VS is higher than the second threshold value VSTh2, application of the braking force to the vehicle is not essential. On the other hand, when the vehicle body speed VS is lower than or equal to the second threshold value VSTh2, application of the braking force to the vehicle is essential.

When the vehicle body speed VS is higher than the second threshold value VSTh2 in step S51 (YES), the process proceeds to the next step S52. In step S52, the required acceleration DVSR is acquired. Subsequently, in step S53, whether or not the required acceleration DVSR is less than the gradient equivalent acceleration DVSθ is determined. The gradient equivalent acceleration DVSθ is an acceleration component of the vehicle generated according to the road surface gradient θ. Therefore, the gradient equivalent acceleration DVSθ becomes negative when the vehicle travels on a climbing road, and the absolute value of the gradient equivalent acceleration DVSθ becomes larger as the road surface gradient θ becomes larger. When the required acceleration DVSR is less than the gradient equivalent acceleration DVSθ, the vehicle body acceleration DVS of the vehicle may become larger than the required acceleration DVSR when the braking force is not applied to the vehicle.

When the required acceleration DVSR is less than the gradient equivalent acceleration DVSθ (S53: YES), the process proceeds to the next step S54. In step S54, a value corresponding to the difference between the required acceleration DVSR and the gradient equivalent acceleration DVS is set as the instruction braking force BPTr. That is, the instruction braking force BPTr increases as the difference becomes larger. When the instruction braking force BPTr is set, the process proceeds to the next step S55.

In step S55, an output process of outputting the instruction braking force BPTr to the braking control unit 22 is executed.

When the instruction braking force BPTr is input by the execution of the output process, the braking control unit 22 controls the braking actuator 21 so that the braking force BP follows the instruction braking force BPTr.

When the output process is executed, the process proceeds to the next step S56. In step S56, similarly to step S154, whether or not the vehicle is stopped is determined. When determination is not made that the vehicle is stopped in step S56 (NO), the process proceeds to step S51 described above. That is, the second stopping braking instruction process is continued. On the other hand, when determination is made that the vehicle is stopped (S56: YES), the second stopping braking instruction process is terminated. Then, the present processing routine is terminated.

When the required acceleration DVSR is greater than or equal to the gradient equivalent acceleration DVS in step S53 (NO), the process proceeds to the next step S57. In step S57, "0 (zero)" is set as the instruction braking force BPTr. Then, the process proceeds to step S55 described above.

When the vehicle body speed VS is lower than or equal to the second threshold value VSTh2 in step S51 (NO), the process proceeds to the next step S58. In step S58, whether or not the vehicle body speed VS is higher than the first threshold value VSTh1 is determined. The first threshold value VSTh1 is an example of a "determination speed" and is lower than the second threshold value VSTh2. The first threshold value VSTh1 is set as a criterion for determining whether or not the vehicle is about to stop.

When the vehicle body speed VS is higher than the first threshold value VSTh1 (S58: YES), the process proceeds to the next step S59. In step S59, the first braking increase amount ΔBP11 is derived. In the present embodiment, the first braking increase amount ΔBP11 is derived based on the road surface gradient θ and the determination as to whether or not another vehicle approaching from behind the host vehicle is detected. That is, a first reference increase amount, which is the basic value of the first braking increase amount ΔBP11, is derived so as to increase as the road surface gradient θ increases. When another vehicle approaching from behind the host vehicle is not detected, the first reference increase amount is set as the first braking increase amount ΔBP11. On the other hand, when another vehicle approaching from behind the host vehicle is detected, the sum of the first reference increase amount and the first correction amount is derived as the first braking increase amount ΔBP11. A positive value is set as the first correction amount. As a result, the first braking increase amount ΔBP11 can be increased the larger the road surface gradient θ. In addition, when another vehicle approaching from behind the host vehicle is detected, the first braking increase amount ΔBP11 can be made larger than when another vehicle approaching from behind the host vehicle is not detected.

That is, in the present embodiment, the braking force corresponds to a "defined force" adjusted to a magnitude corresponding to the road surface gradient θ, and the braking device 20 corresponds to a "defined device".

Subsequently, in step S60, the sum of the instruction braking force BPTr at the current time point and the first braking increase amount ΔBP11 is calculated as the latest instruction braking force BPTr. Then, the process proceeds to step S55 described above.

On the other hand, when the vehicle body speed VS is less than the first threshold value VSTh1 in step S58 (NO), the process proceeds to the next step S61. In step S61, a target braking force BPS, which is a target value of the braking force of the vehicle, is derived. In the present embodiment, the target braking force BPS is derived based on the road surface gradient θ and a determination as to whether or not another vehicle approaching from behind the host vehicle is detected. That is, the target basic braking force, which is the basic value of the target braking force BPS, is derived such that the value becomes larger the larger the road surface gradient θ. That is, the absolute value of the target basic braking force can be said to be a magnitude corresponding to the road surface gradient θ. When another vehicle approaching from behind the host vehicle is not detected, the target basic braking force is set as the target braking force BPS. On the other hand, when another vehicle approaching from behind the host vehicle is detected, the sum of the target basic braking force and the braking correction amount is derived as the target braking force BPS. A positive value is set as the braking correction amount. As a result, the target braking force BPS can be increased the larger the road surface gradient θ. In addition, when another vehicle approaching from behind the host vehicle is detected, the target braking force BPS can be made larger than when another vehicle approaching from behind the host vehicle is not detected.

Subsequently, in step S62, the second braking increase amount ΔBP12 is derived. In the present embodiment, a value corresponding to the target braking force BPS is set as the second braking increase amount ΔBP12 within a range not becoming less than or equal to the first braking increase amount ΔBP11. That is, the second braking increase amount ΔBP12 increases as the target braking force BPS increases. Specifically, the stop time, which is a predicted value of the time required for the vehicle to stop from the current time point, can be derived based on the vehicle body speed VS at the current time point and the difference between the instruction braking force BPTr of the current time point and the target braking force BPS. Then, the second braking increase amount ΔBP12 is derived so that the value becomes larger as the derived stop time becomes shorter.

Then, in step S63, the sum of the instruction braking force BPTr at the current time point and the second braking increase amount ΔBP12 is calculated as the latest instruction braking force BPTr. Then, the process proceeds to step S55 described above. Therefore, the instruction braking force BPTr can be increased to the target braking force BPS until determination is made in step S56 that the vehicle is stopped.

Figure 6A:
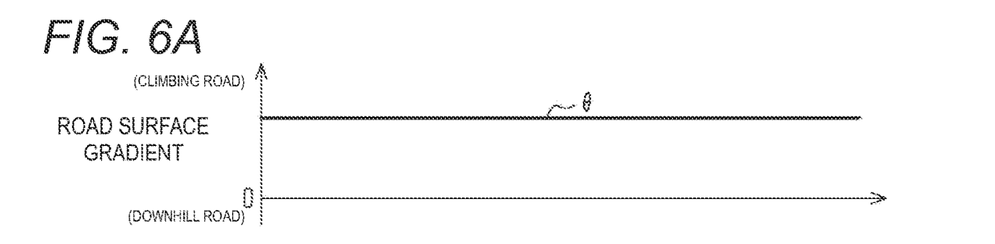
FIGS. 6A to 6E are timing charts when stopping the vehicle on a climbing road in the second embodiment.
Figure 6B:
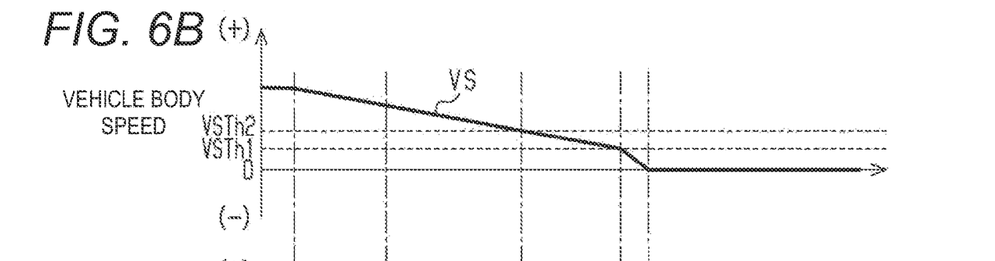
Figure 6C:
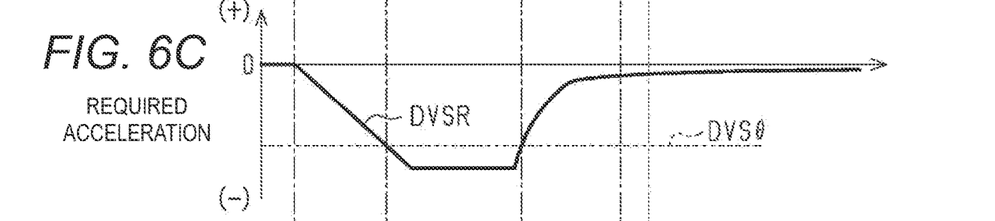
Figure 6D:
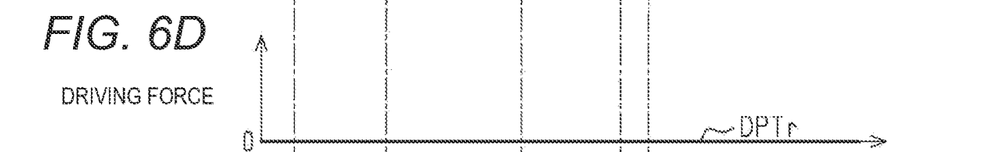
Figure 6E:
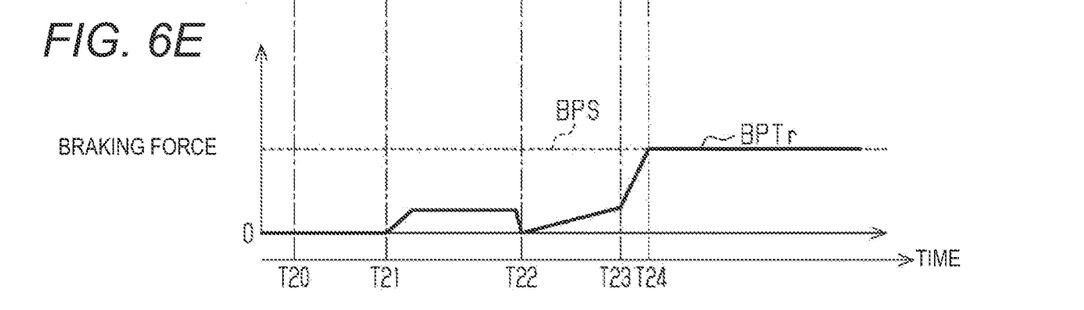

Next, the operation and effect of the present embodiment will be described with reference to FIGS. 6A-6E. As a premise, it is assumed that the vehicle is stopped on a climbing road as illustrated in FIG. 6A.

As illustrated in FIGS. 6A, 6B, 6C, 6D, and 6E, when stopping of the vehicle is instructed at timing T20, the second stopping braking instruction process is started. In the period from timing T20 to timing T21, the vehicle body speed VS is higher than the second threshold value VSTh2, and the required acceleration DVSR is greater than or equal to the gradient equivalent acceleration DVSθ. Therefore, "0 (zero)" is set as the instruction braking force BPTr in this period. Thus, the braking force BP is not applied to the vehicle. As a result, although the vehicle decelerates in the period, the vehicle body acceleration DVS is substantially equal to the deceleration component of the vehicle corresponding to the road surface gradient θ.

In the period from timing T21 to timing T22, the state in which the vehicle body speed VS is higher than the second threshold value VSTh2 is continued, but the required acceleration DVSR becomes less than the gradient equivalent acceleration DVSθ. Therefore, in this period, a value corresponding to the difference between the required acceleration DVSR and the gradient equivalent acceleration DVS is set as the instruction braking force BPTr. Since the instruction braking force BPTr is input to the braking control unit 22, the braking force BP corresponding to the difference is applied to the vehicle. As a result, the vehicle body acceleration DVS of the vehicle can be suppressed from becoming larger than the required acceleration DVSR.

At timing T22, the vehicle body speed VS becomes lower than or equal to the second threshold value VSTh2. Therefore, from timing T22, the instruction braking force BPTr is increased at the speed corresponding to the first braking increase amount ΔBP11 regardless of whether or not the required acceleration DVSR is less than the gradient equivalent acceleration DVSθ. Then, when the vehicle body speed VS becomes lower than or equal to the first threshold value VSTh1 at timing T23, the instruction braking force BPTr is increased at a speed corresponding to the second braking increase amount ΔBP12. As a result, the increasing speed of the braking force BP of the vehicle can be made higher than when the vehicle body speed VS is higher than the first threshold value VSTh1. As a result, even when the vehicle body speed VS becomes "0 (zero)", an event in which the braking force BP of the vehicle does not reach the target braking force BPS corresponding to the road surface gradient θ is less likely to occur.

Then, at timing T24 when the instruction braking force BPTr reaches the target braking force BPS, determination is made that the vehicle is stopped. Therefore, after timing T24, a state in which the braking force BP of the vehicle is equal to the target braking force BPS is maintained. As a result, the occurrence of sliding down of the vehicle can be suppressed.

Here, in a case where the vehicle is stopped on a climbing road, if both the driving force DP and the braking force BP are adjusted, there is a concern that the energy efficiency of the vehicle may lower. In this regard, in the present embodiment, when the stopping of the vehicle is instructed, the driving force DP is not adjusted, that is, the instruction driving force DPTr is held at "0 (zero)". Therefore, the vehicle can be stopped on the climbing road while suppressing lowering in energy efficiency.

The present embodiment can further obtain the following effects.

(1) When the instruction braking force BPTr is increased because the vehicle body speed VS has become less than or equal to the second threshold value VSTh2, the increasing speed is increased as the road surface gradient θ becomes larger. Thus, even when the road surface gradient θ is large, an event in which the braking force BP of the vehicle does not reach the target braking force BPS corresponding to the road surface gradient θ at the time point the vehicle body speed VS becomes "0 (zero)" is less likely to occur.

(2) In the present embodiment, when another vehicle approaching from behind the host vehicle is detected, the target braking force BPS becomes larger than when another vehicle approaching from behind the host vehicle is not detected. Therefore, when another vehicle is approaching the host vehicle from behind, the braking force BP of the vehicle becomes larger than when another vehicle is not approaching the host vehicle from behind, so that the effect of suppressing the sliding down of the vehicle can be further enhanced.

(3) Furthermore, when another vehicle approaching from behind the host vehicle is detected, the increasing speed of the braking force BP of the vehicle can be made higher than when another vehicle approaching from behind the host vehicle is not detected. Therefore, when another vehicle is approaching from behind, an event in which the braking force BP of the vehicle does not reach the target braking force BPS even if the vehicle body speed VS becomes "0 (zero)" is less likely to occur.

Modified Example

Each of the above embodiments can be modified and implemented as follows. Each of the above embodiments and the following modified examples can be implemented in combination with each other within a technically consistent scope.

In the first embodiment, the post-stopping drive instruction process is started at the same timing as the post-stopping braking instruction process. However, if the switching of the driving force DP to the braking force BP can be performed while maintaining the stopping of the vehicle, the post-stopping drive instruction process may not be started at the same time as the post-stopping braking instruction process. For example, the start of the post-stopping drive instruction process may be delayed from the start of the post-stopping braking instruction process.

Figure 7A:
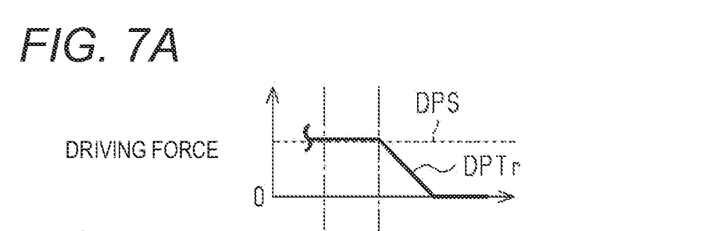
FIGS. 7A and 7B are timing charts after a vehicle stops on a climbing road in a modified example.
Figure 7B:
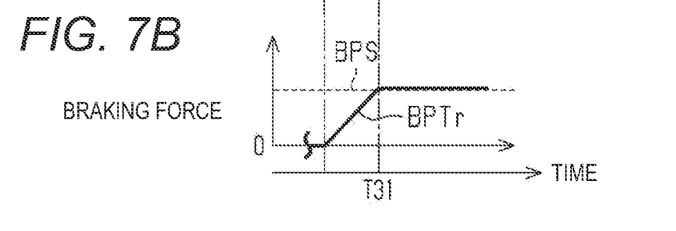

As shown in FIGS. 7A and 7B, the post-stopping drive instruction process may be started from timing T31 when the post-stopping braking instruction process is terminated. Furthermore, the post-stopping drive instruction process may be started from a timing later than timing T31. In this case, the decreasing speed of the instruction driving force DPTr in the post-stopping drive instruction process may be the same as the increasing speed of the instruction braking force BPTr in the post-stopping braking instruction process, or may be higher than the increasing speed of the instruction braking force BPTr.

In the first embodiment, when the vehicle stops, the post-stopping drive instruction process may not be executed.

In the first embodiment, when the vehicle stops, both the post-stopping drive instruction process and the post-stopping braking instruction process may not be executed.

In the first embodiment, the increasing speed of the instruction driving force DPTr in the stopping drive instruction process is varied according to the road surface gradient θ. However, the present disclosure is not limited thereto, and the increasing speed of the instruction driving force DPTr in the stopping drive instruction process may be fixed at a prescribed value regardless of the road surface gradient θ.

In the first embodiment, in a case where the road surface gradient θ decreases after the instruction driving force DPTr reaches the target driving force DPS by the execution of the stopping drive instruction process, the target driving force DPS is decreased, and thus, the instruction driving force DPTr may also be decreased in accordance with the decrease of the target driving force DPS.

In the first embodiment, the target driving force DPS may be derived in consideration of not only the road surface gradient θ but also a determination result as to whether or not another vehicle approaching from behind the host vehicle is detected. For example, in step S11 illustrated in FIG. 2, the target basic driving force, which is the basic value of the target driving force DPS, is derived such that the value becomes larger as the road surface gradient θ becomes larger. That is, the absolute value of the target basic driving force can be said to be a magnitude corresponding to the road surface gradient θ. When another vehicle approaching from behind the host vehicle is not detected, the target basic driving force is set as the target driving force DPS. On the other hand, when another vehicle approaching from behind the host vehicle is detected, the sum of the target basic driving force and the drive correction amount is derived as the target driving force DPS. A positive value is set as the drive correction amount. As a result, the target driving force DPS can be made larger as the road surface gradient θ becomes larger. When another vehicle approaching from behind the host vehicle is detected, the target driving force DPS can be made larger than when another vehicle approaching from behind the host vehicle is not detected. Therefore, when another vehicle is approaching from behind the host vehicle, the effect of suppressing the occurrence of sliding down of the host vehicle can be enhanced. In this case, the driving force corresponds to a "defined force", and the drive device 30 corresponds to a "defined device".

In the first embodiment, the drive increase amount ΔDP1 may be derived in consideration of not only the road surface gradient θ but also a determination result as to whether or not another vehicle approaching from behind the host vehicle is detected. For example, in step S12 illustrated in FIG. 2, the basic drive increase amount, which is the basic value of the drive increase amount ΔDP1, is derived such that the value becomes larger as the road surface gradient θ becomes larger. That is, the absolute value of the basic drive increase amount can be said to be a magnitude corresponding to the road surface gradient θ. When another vehicle approaching from behind the host vehicle is not detected, the basic drive increase amount is set as the drive increase amount ΔDP1. On the other hand, when another vehicle approaching from behind the host vehicle is detected, the sum of the basic drive increase amount and the drive gradient correction amount is derived as the drive increase amount ΔDP1. A positive value is set as the drive gradient correction amount. As a result, the drive increase amount ΔDP1 can be made larger as the road surface gradient θ becomes larger. When another vehicle approaching from behind the host vehicle is detected, the drive increase amount ΔDP1 can be made larger than when another vehicle approaching from behind the host vehicle is not detected. Therefore, when another vehicle is approaching from behind the host vehicle, the driving force DP of the vehicle can be increased to the target driving force DPS at an early stage. As a result, the effect of suppressing the occurrence of sliding down of the own vehicle can be enhanced.

In the second embodiment, the target braking force BPS may not be varied depending on whether or not another vehicle approaching from behind the host vehicle is detected. Even in this case, the target braking force BPS can be set to a magnitude corresponding to the road surface gradient θ.

In the second embodiment, the increasing speed of the instruction braking force BPTr after the vehicle body speed VS becomes less than or equal to the second threshold value VSTh2 may not be varied depending on whether or not another vehicle approaching from behind the host vehicle is detected. Even in this case as well, the increasing speed of the instruction braking force BPTr after the vehicle body speed VS becomes less than or equal to the second threshold value VSTh2 can be made to a magnitude corresponding to the road surface gradient θ.

In the second embodiment, the increasing speed of the instruction braking force BPTr when the vehicle body speed VS is reduced from the second threshold value VSTh2 to the first threshold value VSTh1 may not be made lower than the increasing speed of the instruction braking force BPTr when the vehicle body speed VS is reduced from the first threshold value VSTh1 to "0 (zero)". That is, the increasing speed when the vehicle body speed VS is reduced from the second threshold value VSTh2 to the first threshold value VSTh1 may be the same as the increasing speed when the vehicle body speed VS is reduced from the first threshold value VSTh1 to "0 (zero)". In addition, the increasing speed when the vehicle body speed VS is reduced from the second threshold value VSTh2 to the first threshold value VSTh1 may be made higher than the increasing speed when the vehicle body speed VS is reduced from the first threshold value VSTh1 to "0 (zero)".

In the second embodiment, when the instruction braking force BPTr is increased by the execution of the second stopping braking instruction process, the increasing speed may not be varied according to the road surface gradient θ. In this case, the instruction braking force BPTr can be increased to the target braking force BPS before determination is made that the vehicle is stopped by varying the start timing of the increase of the instruction braking force BPTr according to the road surface gradient θ, that is, by varying the second threshold value VSTh2 according to the road surface gradient θ.

The road surface gradient θ may be acquired by a method different from the method described in each of the above embodiments. For example, information regarding the gradient of the road surface on which the vehicle travels may be received from a navigation device or a server, and the road surface gradient θ may be acquired based on the information.

The power unit may include both an engine and an electric motor as a power source of the vehicle. The power unit may include only an electric motor as a power source of the vehicle.

The invention claimed is:

1. A vehicle control device that controls a drive device and a braking device of a vehicle, the vehicle control device comprising:

a gradient acquisition unit that acquires a road surface gradient which is a gradient of a road surface on which the vehicle travels;
a drive instruction unit that executes a stopping drive instruction process for instructing the drive device to set a driving force of the vehicle to a magnitude corresponding to the road surface gradient when stopping the vehicle on a climbing road; and
a braking instruction unit that executes a stopping braking instruction process of stopping the vehicle by instructing the braking device to apply a braking force corresponding to a required acceleration to the vehicle when stopping the vehicle on the climbing road,
wherein the drive instruction unit, in the stopping drive instruction process, instructs the drive device to increase an increasing speed of the driving force of the vehicle as the road surface gradient becomes larger at the stopping the vehicle on the climbing road.

2. The vehicle control device according to claim 1, wherein
the braking instruction unit executes a post-stopping braking instruction process for instructing the braking device to increase a braking force of the vehicle when the vehicle stops, and
the drive instruction unit executes a post-stopping drive instruction process for instructing the drive device to decrease the driving force of the vehicle when the post-stopping braking instruction process is being executed or after the post-stopping braking instruction process is terminated.

3. The vehicle control device according to claim 2, further comprising
a surrounding information acquisition unit that acquires surrounding information of the vehicle; wherein
when a force for adjusting to a magnitude corresponding to the road surface gradient among a braking force and a driving force of the vehicle is defined as a defined force, and a device that controls the defined force among the braking device and the drive device is defined as a defined device,
if another vehicle approaching the vehicle from behind is detected based on the surrounding information, the defined device is instructed to increase the increasing speed of the defined force more than when another vehicle approaching the vehicle from behind is not detected.

4. The vehicle control device according to claim 2, further comprising
a surrounding information acquisition unit that acquires surrounding information of the vehicle; wherein
when a force for adjusting to a magnitude corresponding to the road surface gradient among a braking force and a driving force of the vehicle is defined as a defined force, and a device that controls the defined force among the braking device and the drive device is defined as a defined device,
if another vehicle approaching the vehicle from behind is detected based on the surrounding information, the defined device is instructed to increase the defined force more than when another vehicle approaching the vehicle from behind is not detected.

5. The vehicle control device according to claim 1, further comprising
a surrounding information acquisition unit that acquires surrounding information of the vehicle; wherein
when a force for adjusting to a magnitude corresponding to the road surface gradient among a braking force and a driving force of the vehicle is defined as a defined force, and a device that controls the defined force among the braking device and the drive device is defined as a defined device, if another vehicle approaching the vehicle from behind is detected based on the surrounding information, the defined device is instructed to increase the increasing speed of the defined force more than when another vehicle approaching the vehicle from behind is not detected.

6. The vehicle control device according to claim 1, further comprising a surrounding information acquisition unit that acquires surrounding information of the vehicle; wherein when a force for adjusting to a magnitude corresponding to the road surface gradient among a braking force and a driving force of the vehicle is defined as a defined force, and a device that controls the defined force among the braking device and the drive device is defined as a defined device, if another vehicle approaching the vehicle from behind is detected based on the surrounding information, the defined device is instructed to increase the defined force more than when another vehicle approaching the vehicle from behind is not detected.

7. A vehicle control device that controls a drive device and a braking device of a vehicle, the vehicle control device comprising:

a gradient acquisition unit that acquires a road surface gradient which is a gradient of a road surface on which the vehicle travels; and a braking instruction unit that executes a stopping instruction process for instructing the braking device to set a braking force of the vehicle to a magnitude corresponding to the road surface gradient regardless of a required acceleration to stop the vehicle when stopping the vehicle on a climbing road from a traveling state; wherein the braking instruction unit, in the stopping instruction process, instructs the braking device to reduce the increasing speed of the braking force when a vehicle body speed of the vehicle is greater than or equal to a determination speed compared to when the vehicle body speed of the vehicle is less than the determination speed at a time just before the vehicle stops.

8. The vehicle control device according to claim 7, further comprising a surrounding information acquisition unit that acquires surrounding information of the vehicle; wherein when a force for adjusting to a magnitude corresponding to the road surface gradient among a braking force and a driving force of the vehicle is defined as a defined force, and a device that controls the defined force among the braking device and the drive device is defined as a defined device, if another vehicle approaching the vehicle from behind is detected based on the surrounding information, the defined device is instructed to increase the increasing speed of the defined force more than when another vehicle approaching the vehicle from behind is not detected.

9. The vehicle control device according to claim 7, further comprising a surrounding information acquisition unit that acquires surrounding information of the vehicle; wherein when a force for adjusting to a magnitude corresponding to the road surface gradient among a braking force and a driving force of the vehicle is defined as a defined force, and a device that controls the defined force among the braking device and the drive device is defined as a defined device, if another vehicle approaching the vehicle from behind is detected based on the surrounding information, the defined device is instructed to increase the defined force more than when another vehicle approaching the vehicle from behind is not detected.

* * * * *